United States Patent

Berner et al.

[11] Patent Number: 5,813,913
[45] Date of Patent: *Sep. 29, 1998

[54] GAME OF SKILL PLAYABLE BY REMOTE PARTICIPANTS IN CONJUNCTION WITH A COMMON GAME EVENT WHERE PARTICIPANTS ARE GROUPED AS TO SKILL LEVEL

[75] Inventors: Mark K. Berner, Santa Clara; David B. Lockton, Atherton, both of Calif.

[73] Assignee: Interactive Network, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 453,403

[22] Filed: May 30, 1995

[51] Int. Cl.$^6$ .................................................. A63F 9/22
[52] U.S. Cl. ................................. 463/40; 463/41; 463/7; 463/9; 463/23
[58] Field of Search .................................... 463/40, 41, 42, 463/23, 29, 13, 26, 28, 7, 6, 9; 364/410, 411, 242.94, 242.95, 242.96; 395/200.01, 200.06, 200.12

[56] References Cited

U.S. PATENT DOCUMENTS 4,592,546   6/1986   Fascenda et al. ......................... 463/40
5,586,257  12/1996   Perlman .................................. 463/42

*Primary Examiner*—Jessica Harrison
*Assistant Examiner*—Michael O'Neill
*Attorney, Agent, or Firm*—Flehr Hohbach Test Albritton & Herbert LLP

[57] ABSTRACT

A game of skill played simultaneously by several players (for example, a live television quiz game) whereby each participant player effectively competes only against players having a similar skill level in order to provide a strong motivation. The system includes a central computer system with each remote participant having a control unit. The control unit either stores and has supplied to it the particular skill level of the player and at the end of the game, only the relative scores at that particular skill level are indicated to that player. The system also provides for effective promotion or updating to a higher skill level of successful players of the game.

7 Claims, 5 Drawing Sheets

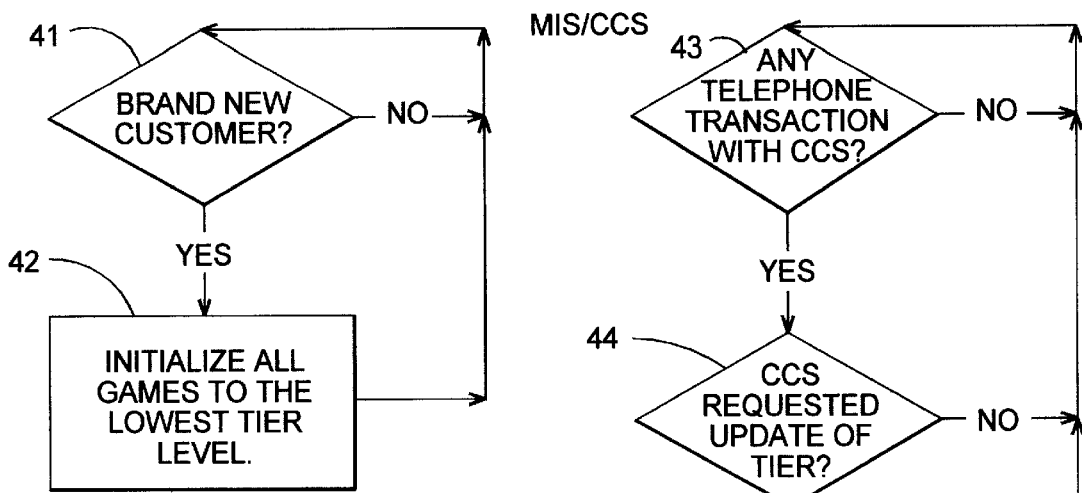
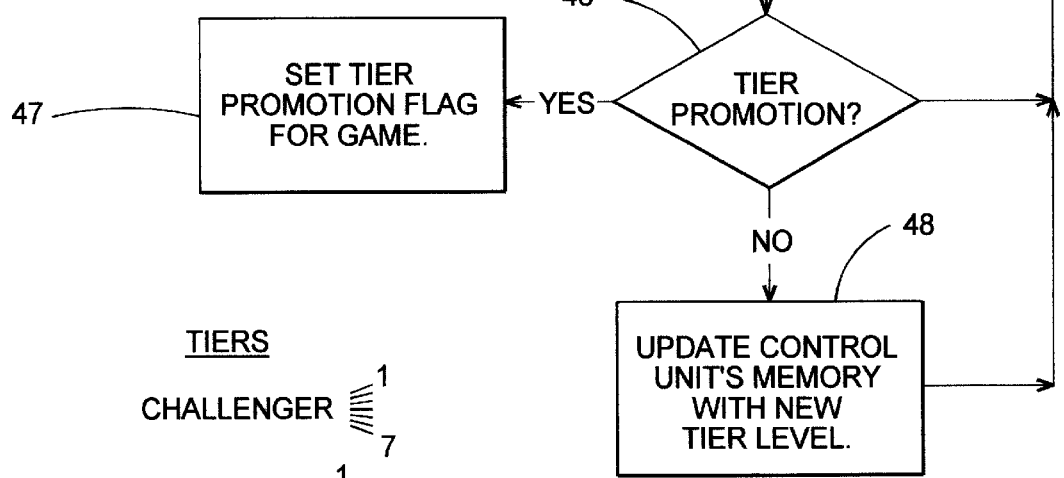
FIG.-4B
FIG.-4A
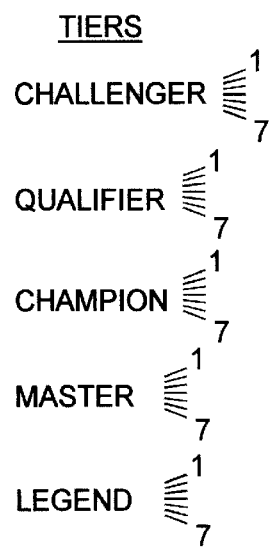
FIG.-3

GAME OF SKILL PLAYABLE BY REMOTE PARTICIPANTS IN CONJUNCTION WITH A COMMON GAME EVENT WHERE PARTICIPANTS ARE GROUPED AS TO SKILL LEVEL

The present invention is directed to a game of skill playable by remote participants in conjunction with a common game event where participants are grouped as to skill level.

BACKGROUND OF THE INVENTION

As described in the Lockton et al U.S. Pat. No. 4,592,546, home television viewers of a football game or a television game per se, such as Wheel of Fortune or Jeopardy, may play along, for example with the television game, to predict, for example, the play called by the quarterback and/or, in the case of a quiz game, to guess the correct answer along with the actual player in the TV studio. As described by the above patent, the player is scored on his success.

Because competition is a very strong motivational factor for all game players, the players will inevitably compare their score to others who are competing at the same time. Since all of the above games, especially the live TV games such as Jeopardy or Wheel of Fortune, are by definition games of skill, this means that the players will improve over time. Since the more experienced or veteran players will inevitably, because of their experience, make the higher scores, a novice player may become discouraged.

OBJECT AND SUMMARY OF INVENTION

It is a general object of the present invention to provide a game of skill where all of the players may compete against other players having a similar skill level.

In accordance with the above object there is provided a game of skill played simultaneously by several participants remote from each other in conjunction with at least one common game event where each participant player of a game receives one or more scores. A common game event is transmitted to each of the remote participants. Control unit means associated with each remote participant receive game play inputs by such participant and score in response to the input.

Central computer system means receive the game scores and determine one of a plurality of skill levels of each of the participants for a particular game and also promote to a relatively higher skill level more successful players of such game. The central computer system also includes means for grouping participants together having similar skill levels and communicates relative game scores to the participants only for that particular skill level. There are means for permanently storing the skill level of each participant for each type of common game event.

BRIEF DESCRIPTION OF THE DRAWINGS

FIG. 3 is a chart illustrating various skill levels or tiers of the present invention.

FIGS. 4A and 4B are flow charts illustrating the operation of another portion of FIG. 1.

DETAILED DESCRIPTION OF PREFERRED EMBODIMENT

Figure 1:
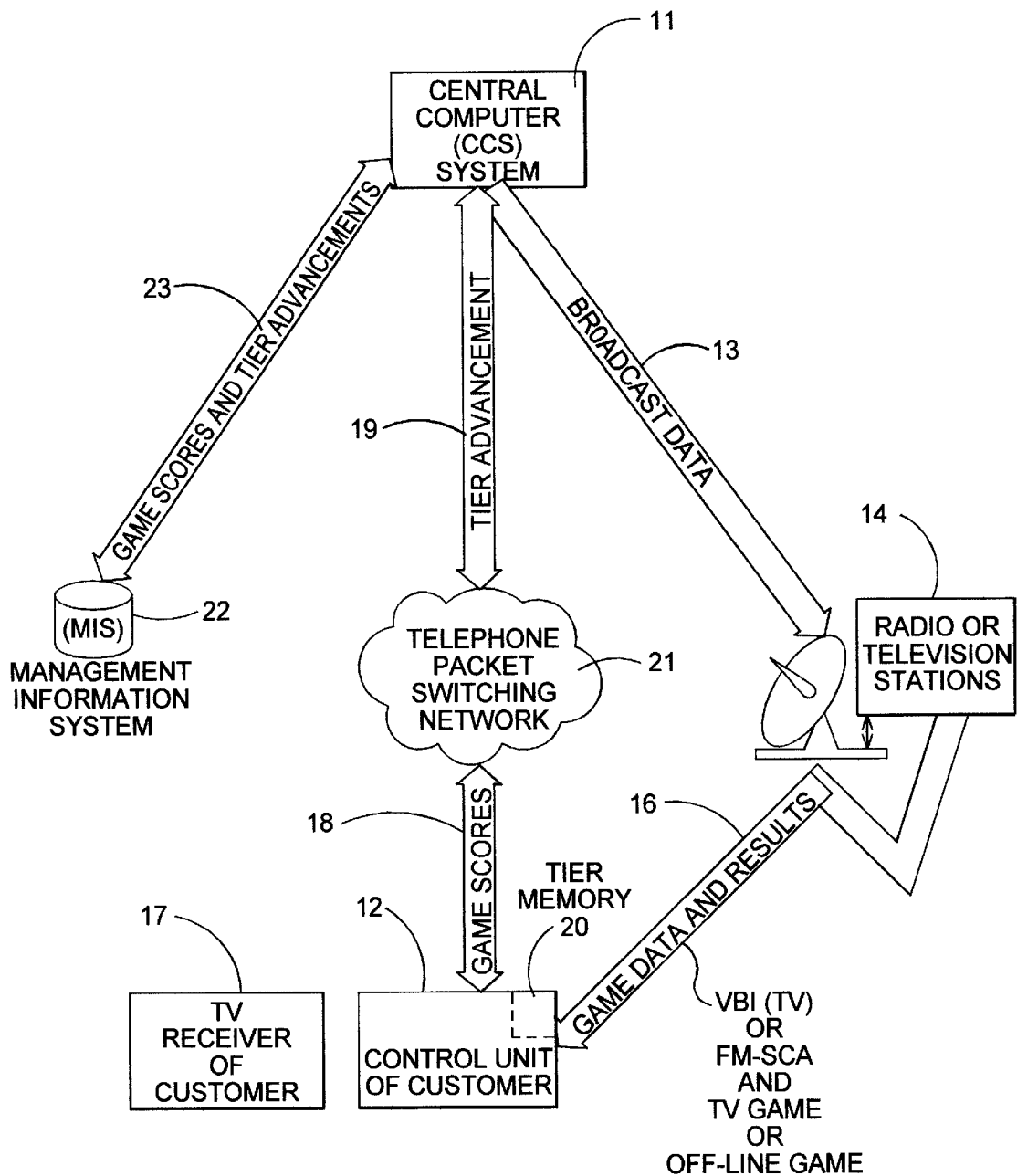
FIG. 1 is a block diagram of a system incorporating the present invention.

FIG. 1 illustrates the overall communications and control network used with the present invention and includes a central computer system (CCS) 11 which regulates or controls the overall system both as to the common game event, for example, football, baseball, Wheel of Fortune, Jeopardy or an offline specialized game specifically directed to the player or customer. CCS 11 also controls things of a supervisory nature such as giving a customer and their associated control unit 12 a particular skill level for the game in which they are playing in order to provide for effective competition.

Specifically, and in more detail, central computer system 11 will broadcast data as shown on link 13 to a satellite dish or other link which is connected to radio and/or TV stations 14. Then these provide a mass communications link 16 to the remote control unit 12 located in the customer's home. Of course, the customer or participant-player would also have their television receiver 17. Referring to the link 16 "designated game data and results", this includes either a vertical blanking interval (VBI) of a TV signal on which perhaps the game itself is being transmitted to the user or on a separate radio FM-SCA channel. Game data includes lockout signals involving player predictions as described in the '546 patent. The present invention contemplates both the use of football or baseball games broadcast live by television or TV game shows or a particular common game event such as a trivia quiz which is initially generated or broadcast by the central computer system 11. The trivia quiz would be received on the display screen of the control unit 12 (not shown) which also includes game inputs (not shown) where the customer may respond; for example, as briefly discussed above, in a football or baseball game, predicting the next play, or in the case of a TV game, giving a proper answer.

Control unit 12 as described in the '546 patent may internally score the player and then at the end of the game, by an internal modem in control unit 12 (not shown but described in the '546 patent), game scores may be uploaded to the central computer system 11, by the links 18 and 19 which extend through the telephone packet switching network 21. As shown by line 19, at the same time a telephone transaction or connection is made with the central computer system 11, other information such as skill level (that is, tier advancement) may be downloaded to the control unit 12 and stored there in memory 20. Thus, control unit 12 will have permanently stored in it the skill level of that particular customer using the control unit; and moreover for that particular type of game.

Finally, to complete the overall system block diagram of the present invention, also in conjunction with central computer system 11 is a management information system (MIS) 22 which through the link 23 to the central computer system provides for overall operational control of the central computer system. This would include, for example, a competition committee setting up advancement criteria to a higher skill level for each intended game; this would be implemented by the central computer system 11 as will be described below.

Figure 2:
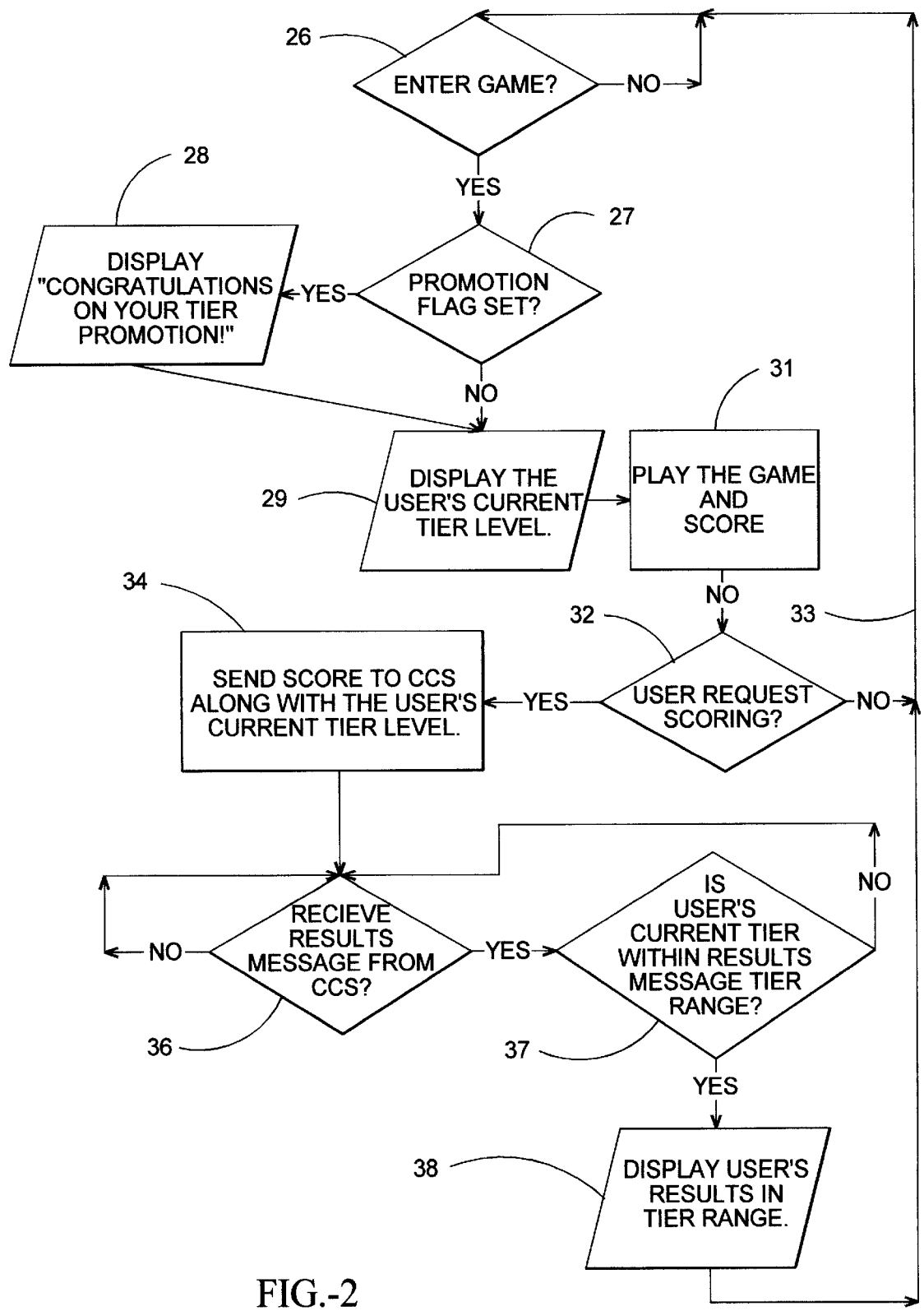
FIG. 2 is a flow chart showing the operation of one portion of FIG. 1.

The flow chart of FIG. 2 illustrates the operation of the customer control unit 12 which includes processing capabilities such as a microprocessor and memory capability (not shown; however, see the '546 patent). In the block 26, the decision is made as to whether to enter a game by, for example, energizing the control unit and allowing it to receive information from the down link 16 (see FIG. 1). After the game is entered, block 27 asks whether a promotion flag has been set. As will be discussed below, this means a promotion from one skill level or tier to another. After the flag has been set, then on the display screen of the control unit there is displayed as shown in block 28 "Congratulations on your Tier Promotion". Then a path goes to block 29 where the customer's current tier level is displayed. Thus, in the control unit of the customer or player participant, the tier level for a particular game is permanently stored. Of course, the central computer system 11 would also include this information. But the fact that the customer control unit has knowledge of the tier level for each game is an advantage for the following three reasons:

1. the control unit can acknowledge what tier the player is in prior to entering a game; if the tier level was only known at the central station or facility, the customer might not be notified of the promotions in a timely manner;
2. the real time system which computes scores and broadcast results does not have to make "a slow" database query to identify the player's tier and this enables the system to have a much larger scoring capacity;
3. when broadcasting results (as will be discussed below) to the various player participants, results can be simultaneously broadcast for all tiers. Then the specific control unit of the customer, because their particular tier or skill level is stored there, can filter or exclude all messages except those scores that relate to the particular tier. This effectively means that the player is competing only against other players for that particular skill level and the motivational factor is still maintained.

Continuing with the flow chart of FIG. 2, the player in block 31 plays the particular game (be a football, baseball game, quiz show, etc.) and the control unit as described in the '546 patent will score the player. In block 32, the user, by activating the telephone uplink (FIG. 1, links 18, 19 and 21), may not request scoring as shown on path 33 or as shown in block 34 send his score to the central computer system (CCS) along with the user's current tier level.

As will be discussed below, when the central computer system receives all of the score information, it will determine the final results and transmit them on the telephone line, as shown in block 36. And as shown in block 37, the user's unit will filter only those results messages which pertain to that particular skill level or tier. And, thus as shown in block 38, only these results are displayed. Thus, the relative game scores are effectively communicated by way of display, that is, only for that particular skill level.

Referring briefly to such skill levels, FIG. 3 shows a table of various skill levels or tiers where all members or players start off at the challenger level, then advance to qualifier; champion; master and legend. As indicated, in conjunction with first challenger level, there may also be seven sublevels (1–7) for each major level. As shown in FIG. 4B, in block 41 when there is a brand new customer (that is, a player has entered the game for the first time) that game, and for that matter all the other games, are initialized at the lowest tier level. This may also happen if a control unit is changed. This decision would be made at the central computer system 11 in conjunction with the management information system 22.

How tier information is changed is shown in the flow chart of FIG. 4A where when any telephone transaction, as shown in block 42, is made by a control unit with the central station, then in block 44 the question is asked whether a tier update or promotion has been requested by the CCS. Details of this are discussed in FIG. 6. But in general a tier promotion occurs if the customer or player in a previous game has performed above a certain level. Next, if a tier promotion occurs as sensed in block 46, then a flag is set at 47 (see step 27 in FIG. 2). Finally, in block 48, the user's control unit memory 20 will be updated with the new tier level.

All of the foregoing is transparent to the user and occurs every time a telephone transaction is made with the central computer system. And this would occur when the player customer is uploading their score or for any other telephone transactions such as if the system is being used for a survey where the customer gives their opinion or perhaps if the system is being used to make a purchase of some item.

Figure 5:
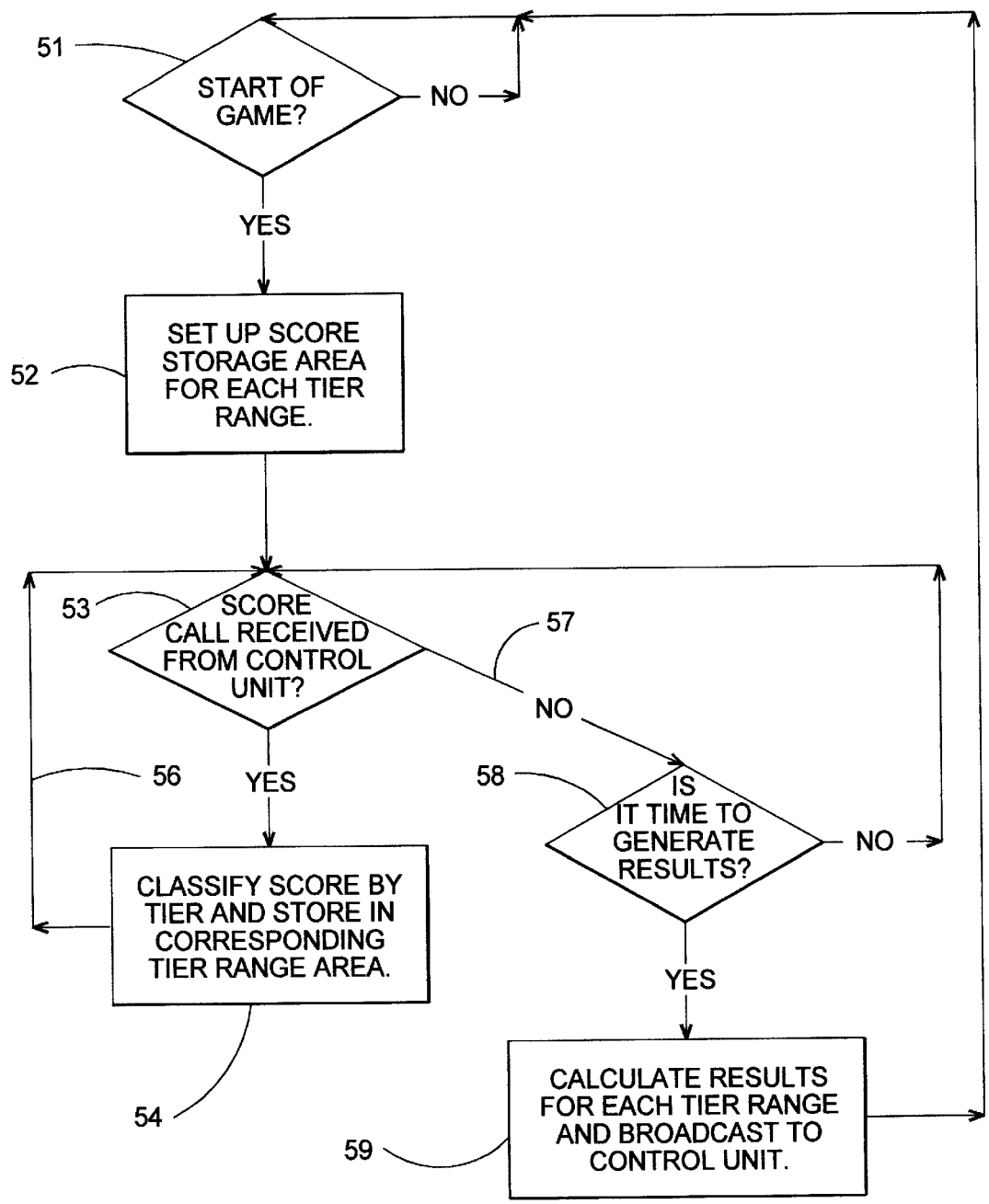
FIG. 5 is a flow chart illustrating the operation of another portion of FIG. 1.

FIG. 5 illustrates the central computer system function with regard to scoring. As shown in block 51, if a game has started, then a score storage area is set up for each tier range in block 52. When a score is received from a control unit, as in block 53, as shown in block 54 that uploaded score from a control unit is classified by tier and stored in the corresponding tier range area (in other words, that particular skill level). Then on the path 56, or alternatively 57, after sufficient scores are received, the question is asked is it time to generate results at block 58. If so, these results are calculated and stored in block 59 for each tier range and broadcast to the control unit (see link 16 of FIG. 1).

With respect to the scoring and determining the winning score, etc., it is not necessary that scoring calls be received from all players. For example, the user may be asked to not upload their score. In other words, by statistical techniques the winner of the game may be forecast. This is all shown in either of the U.S. Pat. Nos. 5,130,138 and 5,120,076.

Figure 6:
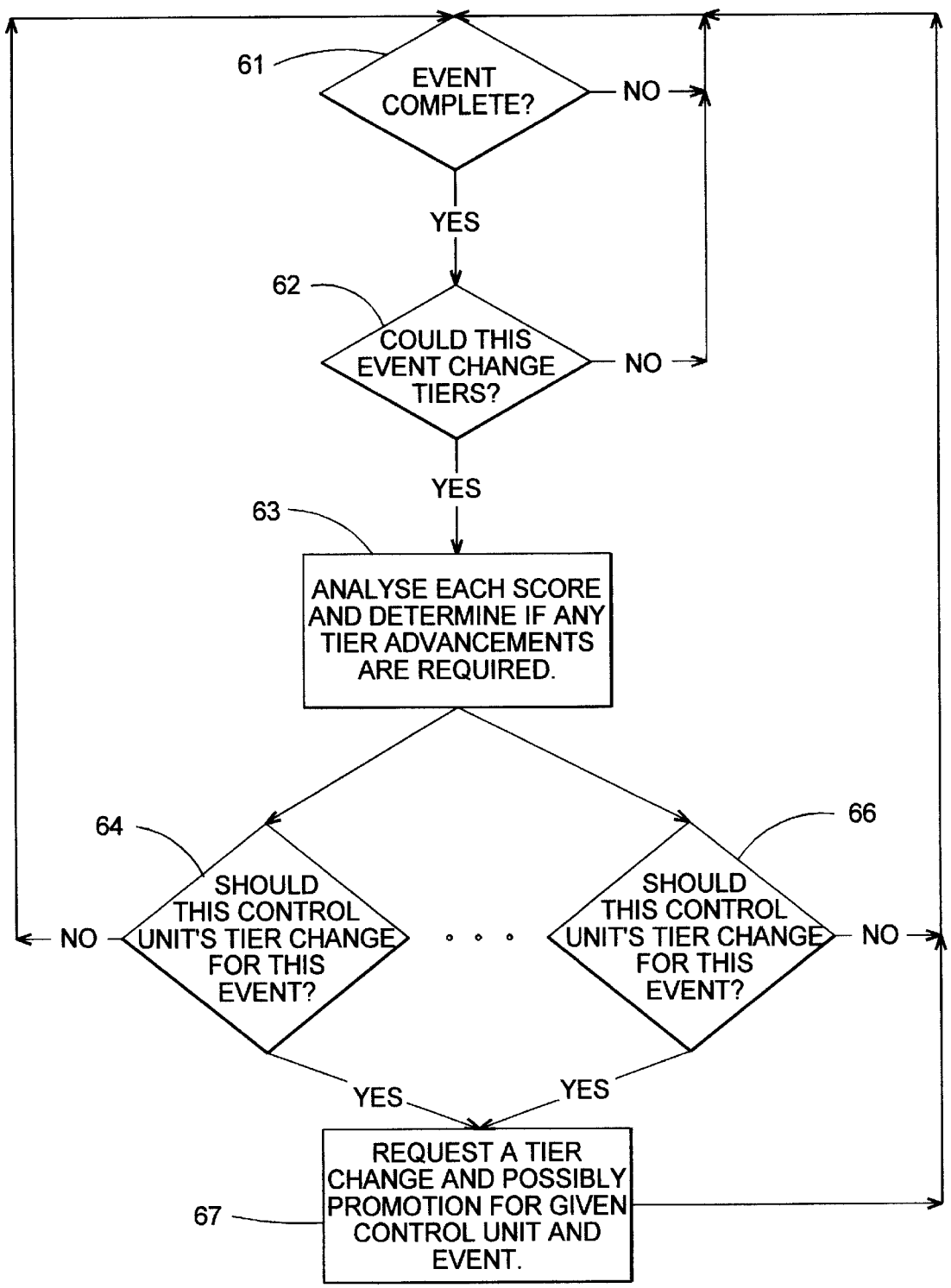
FIG. 6 is a flow chart illustrating another type of operation of FIG. 1.

As discussed above, the central computer system sets up the criteria for advancement from one skill or tier level to the next. And this procedure is shown in FIG. 6 where in the block 61 the question is asked is the event completed, and if so, in block 62, could this even cause a change in tier levels of any of the players. Thus, in step 63 the scores are analyzed to determine if any advancements are required. Here the competition committee would have set up advancement criteria for the game. Typical criteria would include, for example, the highest twenty five percent of the players scoring. As the players meet the advancement criteria, they advance to the appropriate tier. Thus, continuing with the flow chart of FIG. 6, blocks 64 and 66 and in other steps ask each control unit whether their tier should be changed for that particular game. If so, then the information as to tier change is forwarded at block 67 and during the next telephone transaction (see steps 44 and 48 of FIG. 4A) the control unit's memory is updated.

With the use of management information system 22, typically in most cases, customers or players compete only against other customers in that tier. However, there is the capability to allow competition between players in any range of tiers. Thus with this flexibility, there may be occasional "open" tournaments as well as stratified tournaments. In addition, the MIS system can handle a multitude of different situations for any given game at any given time. There are many different ways in which the event might be tiered. For example, when the game is offline (that is, not being broadcast on a live television station) and is being offered throughout the day, at 7:00 a.m. in the morning, when there is a relatively small audience, the early game can be an open game where all tiers are lumped together; in contrast, at 8:00 pm. when there is likely to be many players in stiff competition, then the event could be scheduled for all the available skill levels or tiers. When the event is scheduled, the CCS is notified of the tiering scheme as well as the management information system so they can both perform their tasks accordingly. Moreover, the MIS system has been designed to facilitate the effort in determining individual advancements. The system also easily allows for modifications by the competition committee. For example, if a limitation on the number of players to advance is desired, or a special exception should be made, there is this capability.

In summary the present invention provides that the customer/players play games or compete against other members of similar skill. They are challenged by their level of competition and moreover they are rewarded as they move up the tier ladder. Furthermore, they are not frustrated by comparing their scores to that of the top tier level or legend players. They are encouraged by seeing their scores improve against players who are of similar experience and skill.

What is claimed is:

1. An apparatus for a game of skill played simultaneously by groups of participants, each group several participants of a particular skill level, remote from each other in conjunction with at least one common game event where each participant player of a game receives one or more scores comprising:

means for providing said common game event and transmitting such event to each of said remote participants;

control unit means associated with each remote participant for receiving game play inputs by each participant and scoring in response to said inputs;

central computer system means for defining a predetermined plurality of game skill levels including an initial lowest skill level and several advanced skill levels and for receiving said game scores and determining one of said predetermined plurality of skill levels of each of said participants for a particular game and also promoting to a relatively higher skill level more successful players of each game, said central computer system also including means for grouping participants together having similar said skill levels, and communicating relative game scores to said participants only for that particular skill level;

and means for permanently storing the skill level of each participant for each type of common game event.

2. A game of skill as in claim 1 where said control unit means includes said means for permanently storing the skill level of each participant for each type of common game event.

3. A game of skill as in claim 1 where said common game event is broadcast by a television station and associated game data including a lockout signal to prevent improper game inputs by said participant are transmitted by another mass communication means including one of the following: subcarrier authorization channel of an FM standard broadcast channel, the vertical blanking interval (VBI) of the same TV signal transmitting the game event itself, or another broadcast television signal.

4. A game of skill as in claim 1 wherein said common game event is a live television broadcast of a live game including one of the following types: football, baseball.

5. A game of skill as in claim 1 where said central computer system means broadcasts a lockout signal to prevent improper game inputs by said participants.

6. A game of skill as in claim 1 including means responsive to a said participant forming a dedicated telephone line link with said central computer system means for updating said skill level of said participants for a particular game.

7. A game of skill as in claim 6 where during said updating said control unit includes means for receiving a flag set to provide a congratulatory message to said participant for being upgraded to a higher skill level.

* * * * *